United States Patent [19]

Dournel et al.

[11] Patent Number: 5,380,821
[45] Date of Patent: Jan. 10, 1995

[54] PROCESS FOR THE MANUFACTURE OF POLY(ARYLENE SULPHIDE)

[75] Inventors: Pierre Dournel, Brussels; Danny Van Hoyweghen, Heverlee; Ardéchir Momtaz, Brussels, all of Belgium

[73] Assignee: Solvay (Société Anonyme), Brussels, Belgium

[21] Appl. No.: 75,235

[22] Filed: Jun. 14, 1993

[30] Foreign Application Priority Data

Jul. 14, 1992 [BE] Belgium .............................. 09200652

[51] Int. Cl.$^6$ .............................................. C08G 75/14
[52] U.S. Cl. ...................................... 528/388; 528/322; 528/323
[58] Field of Search ...................... 528/322, 323, 388

[56] References Cited

U.S. PATENT DOCUMENTS

| | | | |
|---|---|---|---|
| 3,354,129 | 11/1967 | Edmonds et al. | 528/388 |
| 3,884,884 | 5/1975 | Scoggins et al. | 528/388 |
| 3,919,177 | 11/1975 | Campbell | 528/388 |
| 4,038,260 | 7/1977 | Campbell | 528/388 |
| 4,537,951 | 8/1985 | Idel et al. | 528/388 |
| 4,645,825 | 2/1987 | Idel et al. | 528/388 |
| 4,663,431 | 5/1987 | Fujii et al. | 528/388 |
| 4,794,163 | 12/1988 | Inoue et al. | 528/388 |
| 4,900,808 | 2/1990 | Idel et al. | 528/388 |
| 5,093,467 | 3/1992 | Sukane et al. | 528/388 |
| 5,145,946 | 9/1992 | Fujii et al. | 528/388 |

FOREIGN PATENT DOCUMENTS

| | | |
|---|---|---|
| 0171021 | 2/1986 | European Pat. Off. . |
| 0355499 | 2/1990 | European Pat. Off. . |
| 0166368 | 11/1991 | European Pat. Off. . |
| 3615030 | 11/1986 | Germany . |
| 3725997 | 2/1988 | Germany . |

*Primary Examiner*—John Kight, III
*Assistant Examiner*—Shelley A. Dodson
*Attorney, Agent, or Firm*—Spencer, Frank & Schneider

[57] ABSTRACT

Process for the manufacture of poly(arylene sulphide) comprising the reaction of a dihalogenated aromatic compound with alkali metal sulphide in a polar organic solvent in the presence of a compound chosen from sulphimides and their alkali metal salts.

8 Claims, No Drawings

PROCESS FOR THE MANUFACTURE OF POLY(ARYLENE SULPHIDE)

FIELD OF THE INVENTION

The present invention relates to a process for the manufacture of poly(arylene sulphide), more particularly of poly(phenylene sulphide), from dihalogenated aromatic compounds and alkali metal sulphides.

TECHNICAL REVIEW

Poly(arylene sulphide)s (hereinafter called PAS), such as poly(phenylene sulphide) (hereinafter called PPS), have excellent thermal stability and very good chemical resistance which make them a material of choice for the moulding of components which can be used especially in electrical and electronic applications and in the automobile industry.

A well-known process for the manufacture of PAS comprises heating an alkali metal sulphide, most often hydrated sodium sulphide, in a polar solvent in order to remove the water of hydration therefrom, followed by the addition of a dihalogenated aromatic compound, in particular p-dichlorobenzene, and polymerisation at a higher temperature [see, for example, U.S. Pat. No. 3,354,129 (Phillips Petroleum)]. PAS prepared according to this process has the disadvantage of having a low molecular weight.

It has already been proposed to overcome this disadvantage by introducing, into the polymerisation medium of PAS, additives which make it possible to increase the molecular weight of the latter. Alkali metal carboxylates are disclosed to be efficient additives [U.S. Pat. No. 3,919,177 (Phillips Petroleum)].

The use of these additives, however, has the disadvantage of bringing about the presence of significant amounts of organic acids which contaminate the waste water resulting from the recovery of PAS.

Another disadvantage linked to the use of these additives lies in the fact that they lead to PASs having a heterogeneous particle size distribution composed of at least two different particle size fractions (small and large particles) whose respective molecular weights are very different, the consequence of which is that the use of these PASs is complicated.

SUMMARY OF THE INVENTION

The present invention is consequently aimed at providing a process for the manufacture of high molecular weight PAS in the presence of a polymerisation additive which does not have these disadvantages.

To this end, the invention relates to a process for the manufacture of poly(arylene sulphide) comprising the reaction of a dihalogenated aromatic compound with an alkali metal sulphide in a polar organic solvent in the presence of a compound (C) chosen from sulphimides and their alkali metal salts.

DETAILED DESCRIPTION OF THE INVENTION

Dihalogenated aromatic compound which can be used in the process according to the invention is understood to denote the compounds containing at least one aromatic ring and containing at least two halo substituents. It may be:

a dihalobenzene such as o-dichlorobenzene, m-dichlorobenzene, p-dichlorobenzene, o-dibromobenzene, m-dibromobenzene, p-dibromobenzene, p-diiodobenzene, 1-chloro-4-bromobenzene and 1-chloro-4-iodobenzene;

a substituted dihalobenzene such as 2,5-dichlorotoluene, 2,5-dichloro-p-xylene, 1-ethyl-2,5-dichlorobenzene, 1-ethyl-2,5-dibromobenzene, 1-ethyl-2-bromo-5-chlorobenzene, 1,2,3,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-(p-toluyl)-2,5-dichlorobenzene, 1-(p-toluyl)-2,5-dibromobenzene and 1-hexyl-2,5-dichlorobenzene;

a dihalobiphenyl such as 4,4'-dichlorobiphenyl;

a (dihalobiphenyl)alkane such as 2,2-di(p-chlorophenyl)propane;

a dihalonaphthalene such as 1,4-dichloronaphthalene, 1,6-dichloronaphthalene, 2,6-dichloronaphthalene, 1,6-dibromonaphthalene and 2,6-dibromonaphthalene;

a dihalogenated aromatic carboxylic acid such as 3,5-dichlorobenzoic acid;

a dihalodiphenyl derivative such as 4,4'-dichlorodiphenyl ether, 4,4'-dichlorodiphenyl ketone, 4,4'-di-chlorodiphenyl sulphide and 4,4'-dichlorodiphenyl sulphoxide.

Among all these dihalogenated aromatic compounds, the p-dihalobenzenes are preferred and, among the latter, very particularly p-dichlorobenzene.

The use of several different dihalogenated aromatic compounds also comes within the scope of the invention.

The introduction, into the medium for the manufacture (polymerisation) of PAS, of trihalogenated aromatic compounds also comes within the scope of the invention.

Examples of such compounds are 1,2,3-trichlorobenzene and 1,2,4-trichlorobenzene. Used in small amounts (approximately $1.10^{-4}$ to approximately $1.10^{-2}$ mol per mole of dihalogenated aromatic compound), these compounds lead to the production of PAS having a low degree of branching and of higher molecular weight.

Alkali metal sulphides which can be used in the process according to the invention are understood to denote not only the said sulphides introduced as such into the medium for the manufacture (polymerisation) of PAS, before the latter, but also the sulphides arising from the reaction between a suitable sulphur source and a suitable base, before or during polymerisation.

Examples of alkali metal sulphides which can be introduced as such into the medium for the manufacture of PAS are sodium, potassium, lithium, rubidium and caesium sulphides and their mixtures. These sulphides can be used in the anhydrous form, in the form of hydrates or in the form of aqueous solutions. Among these sulphides, sodium sulphides are preferred for reasons of accessibility.

As mentioned above, the sulphides which can be used according to the invention can also arise from the reaction between a suitable sulphur source and a suitable base. Examples of suitable sulphur sources are alkali metal thiosulphates and hydrosulphides, hydrogen sulphide and carbon disulphide. These sulphur sources have to react, before or during polymerisation, with a suitable base so as to generate the alkali metal sulphide present during polymerisation. Examples of suitable bases are alkali metal hydroxides and carbonates. Although the amount of base reacted with the sulphur source can vary depending on the specific nature of the latter, this amount is generally between the stoichiometric amount and an excess of 0.50 mol with respect to the latter, preferably between the stoichiometric amount and an excess of 0.25 mol with respect to the latter.

The process for the manufacture of PAS according to the invention is carried out in a polar organic solvent generally chosen from aprotic organic solvents such as amides, lactams, urea derivatives and cyclic organophosphorus compounds. Amides and lactams are preferably used.

Amides which can be used are, for example, formamide and its N-substituted derivatives such as N,N-dimethylformamide; acetamide and its N-substituted derivatives such as N,N-dimethylacetamide, N,N-diethylacetamide and N,N-dipropylacetamide; N,N-dimethylbenzamide and the like.

Lactams which can be used are, for example, caprolactam and its N-substituted derivatives such as the N-alkylcaprolactams, for example N-methylcaprolactam, N-ethylcaprolactam, N-(n-propyl)caprolactam, N-isopropylcaprolactam, N-(n-butyl)caprolactam, N-isobutylcaprolactam and N-cyclohexylcaprolactam; pyrrolidone and its N-substituted derivatives such as the N-alkylpyrrolidones, for example N-methyl-2-pyrrolidone, N-ethyl-2-pyrrolidone, N-(n-propyl)-2-pyrrolidone, N-isopropyl-2-pyrrolidone, N-(n-butyl)-2-pyrrolidone, N-isobutyl-2-pyrrolidone, N-cyclohexyl-2-pyrrolidone, N-methyl-3-methyl-2-pyrrolidone, N-ethyl-3-methyl-2-pyrrolidone and N-methyl-3,4,5-trimethyl-2-pyrrolidone; α-piperidone and its N-substituted derivatives such as the N-alkylpiperidones, for example N-methyl-2-piperidone, N-ethyl-2-piperidone, N-propyl-2-piperidone, N-isopropyl-2-piperidone, N-methyl-6-methyl-2-piperidone, N-methyl-3-ethyl-2-piperidone, and the like.

Other examples of polar organic solvents are tetramethylurea, N,N'-dimethylethylene urea, N,N'-di-methylpropylene urea, 1-methyl-1-oxosulphorane, 1-ethyl-1-oxosulphorane, 1-phenyl-1-oxosulphorane, 1-methyl-1-oxophosphorane, 1-(n-propyl)-1-oxophosphorane, 1-phenyl-1-oxophosphorane, and the like.

Particularly preferred polar organic solvents are the N-alkyllactams and the N-alkylpyrrolidones, very particularly N-methylpyrrolidone.

The amount of polar organic solvent used to carry out the process according to the invention is not critical and can vary to a large extent. Expressed in weight, this amount is generally between 0.5 and 20 times the weight of alkali metal sulphide used; preferably, the amount of polar organic solvent is between 1 and 10 times, very particularly between 2 and 5 times, the weight of alkali metal sulphide.

According to the invention, the medium in which the process for the manufacture of PAS is carried out also contains a compound (C) chosen from sulphimides and their alkali metal salts.

Sulphimides which can be used in the process according to the invention are understood to denote any imide derived from bodies having acid and sulphonic acid functional groups containing the —CO—NH—SO$_2$— group.

These sulphimides can be represented by one of the formulae below:

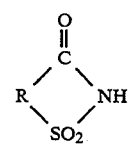

or

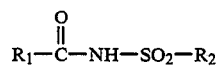

in which R, R$_1$ and R$_2$ are optionally substituted aliphatic or aromatic hydrocarbon radicals containing from 2 to 24 carbon atoms.

The cyclic sulphimides corresponding to the formula (I) above in which R is an unsubstituted aromatic hydrocarbon radical are preferred. A typical example of such a sulphimide is benzosulphimide (cyclic imide of o-sulphobenzoic acid, also called saccharin) corresponding to the formula

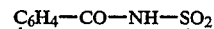

The alkali metal salts (sodium, potassium, lithium, rubidium and caesium) of these sulphimides can also be used, preferably the sodium salts and very particularly the sodium salt of benzosulphimide (sodium saccharinate) which is commercially available.

The amount in which the compound (C) is present in the medium for the polymerisation of PAS can vary to a large extent. It is expressed by the molar ratio of the amount of compound (C) to the amount of alkali metal sulphide used. This ratio generally varies from 0.1 to 10 mol of compound (C) per mole of alkali metal sulphide. Preferably, this ratio is at least equal to approximately 0.15, more particularly at least equal to approximately 0.20 mol of compound (C) per mole of alkali metal sulphide. Also preferably, this ratio is at most equal to approximately 1, more particular at most equal to approximately 0.60 mol of compound (C) per mole of alkali metal sulphide.

All the operating conditions generally known for manufacturing PASs are suitable for carrying out the process of manufacture according to the invention. Thus, the dihalogenated aromatic compound (hereinafter called DAC), the alkali metal sulphide (hereinafter called AMS) and the compound (C) can be added to the polar organic solvent (hereinafter called POS) in any order, for example by introducing them as a mixture or separately into the POS, the molar ratio between the respective amounts of DAC and AMS, capable of bringing about the reaction for the formation (polymerisation) of PAS, generally being from 0.75 to 2.0 and preferably from 0.9 to 1.2.

A particular embodiment of the process for the manufacture of PAS according to the invention comprises the incorporation of the AMS and of the compound (C) in the POS to form a first mixture (mixture 1) and the addition, to this mixture 1, of the DAC to form a reaction mixture (mixture 2) in which the formation of PAS is carried out. Mixture 1 is generally maintained at a temperature between approximately 40° and approximately 230° C. for a period of 5 minutes to 4 hours. Often, one of the constituents of the mixture 1, most frequently the AMS, is hydrated and the mixture 1 can consequently contain an excessively high amount of water which can disrupt the reaction for the formation of PAS in the mixture 2. The mixture 1, in this case, is preferably subjected to a dehydration treatment before addition of the DAC. This treatment is generally carried out on the cooled mixture 1 by any conventional dehydrating means, such as azeotropic distillation of the mixture 1 or its rectification under reduced pressure. The mixture 2 resulting from the addition of the DAC to the thus dehydrated mixture 1 is then generally heated from 180° to approximately 330° C., preferably from 220° to 300° C., for a period from 5 minutes to 20 hours, preferably from 30 minutes to 10 hours, sufficient for the reaction for the formation of PAS to be carried out. This reaction is generally carried out in an inert atmosphere (nitrogen, argon and the like) and generally at a pressure ranging from the autogenous pressure of the system to approximately 50 kg/cm$^2$. The mixture 2 is then cooled arid the PAS formed is separated therefrom by any conventional means, such as settling or filtration for example. The collected PAS is generally purified from the residues from its manufacture by washing with water and finally dried.

According to a variant of the above embodiment, the synthesis of PAS is carried out so as to obtain a "prepolymer" in the mixture 2 at a temperature from approximately 150° to approximately 250° C., preferably from 180° to 230° C., the other operating conditions applied to the mixture 2 being similar to those stated above. The mixture 2, which exists in the form of a suspension containing the PAS "prepolymer" formed, then has water added to it at a concentration of 0.1 to 10 mol, preferably 0.5 to 5 mol, per mole of AMS used; the mixture 2 then exists in the form of a two-phase mixture in which polymerisation is continued under the general operating conditions mentioned above. Other details relating to this variant can be found in Patent Application EP-A-0,166,368 (Kureha), the contents of which are incorporated for reference in the present description.

Besides the ingredients mentioned above, the mixture 1 and/or the mixture 2 can also contain a small amount (generally from 0.1 to 2% by weight with respect to the weight of AMS used) of an alkali metal hydroxide, such as sodium hydroxide itself. The presence of this hydroxide compensates for the harmful effect of the sulphur-containing impurities possibly contained in the AMS.

According to the invention, the mixture 2 can also contain, besides the compound (C), other agents known to increase the molecular weight of PAS, such as esters, anhydrides, alkali metal alkyl- and arylcarboxylates, alkali metal alkyl- and arylsulphonates, amino acids, phosphonates, dialkylamides, organophosphorus compounds, piperazinones, polyols, and the like.

According to the invention, the process for the manufacture of PAS can be carried out in reactors, the walls of which, in contact with the reaction mixture, can consist of or be coated with stainless steels, such as chromium steels which can contain titanium and/or niobium; titanium and alloys of this metal with palladium, aluminium and/or vanadium; platinum; rhodium; tantalum; hafnium; niobium; zirconium and alloys of this metal with tin, iron, chromium and/or nickel.

The PASs obtained according to the process of the invention can be conventionally mixed with other polymers, pigments, fillers (glass fibres, talc, calcium carbonate, silica, mica, metal powders, quartz powder, glass beads, carbon fibres, graphite, carbon black and the like), stabilising agents, lubricating agents, and the like.

The PASs obtained according to the process of the invention can be converted by known moulding methods to injected articles, for use in electrical, electronic and mechanical applications, to films and to fibres. They can also constitute the base of liquid coating compositions, compositions for encapsulating microelectronic components or also the matrix of thermally and mechanically resistant composites.

An advantage of the process according to the invention lies in the fact that the presence of the compound (C) in the medium for the manufacture of PAS leads to a polymer whose particle size fractions are characterised by high and very close molecular weights; in other terms, the yield of polymer of higher molecular weight is increased.

Another advantage of the process according to the invention is that the compound (C), especially in the form of the sodium salt, is generally soluble in the POS and can thus be recycled with the latter.

The following examples illustrate the invention.

EXAMPLE 1

A 1 l titanium autoclave is charged with 96.08 g of Na$_2$S.3H$_2$O (0.704 mol of Na$_2$S), 225 g of N-methylpyrrolidone (NMP), 30.32 g (0.148 mol) of the sodium salt of benzosulphimide (sodium saccharinate) (NABS) and 1.15 g (0.029 mol) of sodium hydroxide (NaOH).

The reaction mixture is brought progressively to 210° C. and 40.02 g of a mixture of NMP and of water are distilled. The temperature of the autoclave is then reduced to 160° C., at which temperature the following ingredients are added: a solution of 109.13 g (0.742 mol) of p-dichlorobenzene (PDCB) in 84 g of NMP and an aqueous sodium hydroxide solution containing 0.42 g (0.011 mol) of NaOH in 5.51 g of water. The temperature is then brought to 240° C. for a period of 90 min and then to 265° C. for the same period.

The polymer is then isolated from the medium and separated into two particle size fractions [250 micron (μm) sieve]. The finest particles (22%) (% by weight with respect to the Na$_2$S used) have an inherent viscosity (measured in 1-chloronaphthalene at 206° C. and at a concentration of 10 g/l) of 0.26 dl/g. Those of larger particle size (72%) (idem) have an inherent viscosity of 0.29 dl/g.

The overall yield of PPS is, by this process, brought to 94%.

EXAMPLE 2

A 0.5 l titanium autoclave is charged with 50.01 g of Na$_2$S.3H$_2$O (0.366 mol of Na$_2$S), 113.61 g of NMP, 15.60 g (0.076 mol) of NaBS and 0.24 g (0.006 mol) of NaOH.

The reaction mixture is brought progressively to 210° C. and 18.58 g of a mixture of NMP and of water are distilled. The temperature of the autoclave is then reduced to 160° C., at which temperature the following ingredients are added: a solution of 56.50 g (0.384 mol) of PDCB in 44.2 g of NMP and an aqueous sodium hydroxide solution containing 0.42 g (0.011 mol) of NaOH in 3.12 g of water.

The temperature is then brought to 265° C. for a period of 3 h. The PPS obtained is separated into two particle size fractions (250 μm sieve). The finest particles (49%) have an inherent viscosity of 0.24 dl/g. Those of larger particle size (43%) have an inherent viscosity of 0.25 dl/g. The overall yield is thus brought to 92%.

EXAMPLE 3R

This example is provided as a comparison.

A 0.5 l titanium autoclave is charged with 50.01 g of $Na_2S.3H_2O$ (0.366 mol of $Na_2S$), 97.28 g of NMP, 6.43 g (0.078 mol) of sodium acetate and 0.31 g (0.008 mol) of NaOH.

The temperature of the autoclave is brought progressively to 211° C. and 15.61 g of a mixture of NMP and of water are distilled. The autoclave is then cooled to 160° C. and the following ingredients are added: a solution of 56.02 g (0.381 mol) of PDCB in 56.7 g of NMP and an aqueous sodium hydroxide solution containing 0.09 g (0.002 mol) of NaOH in 2.66 g of water.

The temperature of the autoclave is brought to 265° C. and maintained for 3 h.

The polymer obtained is separated into two particle size fractions (250 μm sieve) of different inherent viscosities. The finest particles (16%) have an inherent viscosity of 0.19 dl/g. The biggest (69%) have an inherent viscosity of 0.28 dl/g. The overall yield of PPS is thus brought to 85%.

EXAMPLE 4

A 1 l titanium autoclave is charged with 70 g of $Na_2S.3H_2O$ (0.512 mol of $Na_2S$), 126.25 g of NMP and 2.54 g (0.064 mol) of NaOH.

The temperature of the autoclave is brought progressively to 210° C. and 36.81 g of a mixture of NMP and water are distilled. The reactor is then cooled to 160° C. and the following ingredients are added: a solution of 79.71 g (0.542 mol) of PDCB in 56.15 g of NMP, an aqueous sodium hydroxide solution containing 3.1 g (0.078 mol) of NaOH in 5.09 g of $H_2O$ and a solution of 19.76 g (0.096 mol) of benzosulphimide in 50 g of NMP.

The temperature of the reactor is then brought to 240° C. for 90 min and then to 265° C., also for 90 min.

The PPS obtained exists in the form of two particle size fractions (250 μm sieve) of the same inherent viscosity equal to 0.25 dl/g (yield 93%).

We claim:

1. A process for the manufacture of poly(arylene sulphide) comprising the reaction of a dihalogenated aromatic compound with an alkali metal sulphide in a polar organic solvent, said process being carried out in the presence of a compound (C) chosen from sulphimides and their alkali metal salts.

2. The process according to claim 1, wherein the sulphimide corresponds to the formula

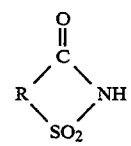

in which R is an unsubstituted aromatic hydrocarbon radical.

3. The process according to claim 1, wherein the compound (C) is benzosulphimide or its sodium salt.

4. The process according to claim 1, wherein the dihalogenated aromatic compound is a p-dihalobenzene.

5. The process according to claim 1, wherein the alkali metal sulphide is a sodium sulphide.

6. The process according to claim 1, wherein the polar organic solvent is an N-substituted pyrrolidone derivative.

7. The process according to claim 1, wherein the amount of compound (C) present is from 0.1 to 10 mol of compound (C) per mole of alkali metal sulphide.

8. The process according to claim 1, applied to the manufacture of poly(phenylene sulphide).

* * * * *